(12) United States Patent
McAuliffe et al.

(10) Patent No.: US 6,367,048 B1
(45) Date of Patent: Apr. 2, 2002

(54) METHOD AND APPARATUS FOR LOGICALLY REJECTING PREVIOUSLY RECORDED TRACK RESIDUE FROM MAGNETIC MEDIA

(76) Inventors: Richard McAuliffe, 2960 Lafayette Dr., Boulder; Thomas E. Zaczek, 952 Cleveland Ct., Louisville, both of CO (US) 80027

(*) Notice: Subject to any disclaimer, the term of this patent is extended or adjusted under 35 U.S.C. 154(b) by 0 days.

(21) Appl. No.: 09/192,794

(22) Filed: Nov. 16, 1998

(51) Int. Cl.[7] .................. G11B 20/18; H03M 13/15; H03M 13/29

(52) U.S. Cl. .................. 714/758; 714/769; 714/771; 714/805

(58) Field of Search .................. 714/769, 771, 714/805, 758

(56) References Cited

U.S. PATENT DOCUMENTS

| | | | |
|---|---|---|---|
| 3,821,710 A | 6/1974 | Arciprete et al. | 340/172.5 |
| 3,962,727 A | 6/1976 | Kamimura et al. | 360/85 |
| 4,011,587 A | 3/1977 | Arter et al. | 360/62 |
| 4,099,211 A | 7/1978 | Hathaway | 360/109 |
| 4,106,065 A | 8/1978 | Ravizza | 360/109 |
| 4,125,881 A | 11/1978 | Eige et al. | 360/50 |
| 4,172,265 A | 10/1979 | Sakamoto et al. | 360/70 |
| 4,175,267 A | 11/1979 | Tachi | 358/4 |
| 4,215,377 A | 7/1980 | Norris | 360/73 |
| 4,257,075 A | 3/1981 | Wysocki et al. | 360/96.5 |
| 4,293,879 A | 10/1981 | Heitmann et al. | 360/10 |
| 4,357,639 A | 11/1982 | Hama et al. | 360/85 |
| 4,390,915 A | 6/1983 | Matsuyama | 360/104 |
| 4,394,694 A | 7/1983 | Ninomiya et al. | 360/14.3 |
| 4,404,605 A | 9/1983 | Sakamoto | 360/77 |
| 4,412,260 A | 10/1983 | Stricklin et al. | 360/97 |
| 4,420,778 A | 12/1983 | Sakamoto | 360/77 |
| 4,467,373 A | 8/1984 | Taylor et al. | 360/38.1 |
| 4,484,236 A | 11/1984 | Wilkinson | 360/10.3 |
| 4,486,796 A | 12/1984 | Sakamoto | 360/77 |
| 4,491,886 A | 1/1985 | Saito et al. | 360/85 |

(List continued on next page.)

FOREIGN PATENT DOCUMENTS

| | | |
|---|---|---|
| DE | 29 06 836 A1 | 9/1980 |
| JP | 56-93157 | 7/1981 |
| JP | 58-133665 | 2/1982 |
| JP | 57-55579 | 4/1982 |
| JP | 59-139157 | 1/1983 |

OTHER PUBLICATIONS

Pizzi, New Audio Recording Formats, Broadcast Engineering, Feb. 1993, paragraph. 60–63.

NT–1, Apr. 1992.

Sasake, T., Asltad, J., Younker, M., The NT Digital Mcro Tape Recorder, Goddard Conference on Mass Storage Systems and Technologies, Sep. 22–24, 1992, paragraph. 143–157.

*Primary Examiner*—Stephen Baker
(74) *Attorney, Agent, or Firm*—The Law Offices of Jessica Clement

(57) ABSTRACT

A method for logically rejecting previously recorded track residue from magnetic media is presented. A session ID unique to a given recording session is encoded into track packet error check and error correction codes but is not itself actually written to tape. During a data recovery session, a reference session ID for the original recording session is acquired by reconstructing the packet session ID from the first few track packets and verifying that a predetermined number of consecutive track packets have identical packet session IDs. Once the reference packet session ID is acquired, it is preloaded into error detection and correction hardware. When a residue track encoded with a previously recorded session ID is recovered by the tape drive track packet detection circuitry, it is inherently rejected because the error detection and correction hardware detects an error and it is therefore never allowed into the data buffer.

12 Claims, 8 Drawing Sheets

U.S. PATENT DOCUMENTS

| | | | |
|---|---|---|---|
| 4,492,991 A | 1/1985 | Osada et al. .................. 360/70 |
| 4,544,967 A | 10/1985 | Louth .......................... 360/77 |
| 4,554,598 A | 11/1985 | Tarbox et al. ................ 360/48 |
| 4,559,568 A | 12/1985 | Watanabe et al. ............. 360/48 |
| 4,581,662 A | 4/1986 | Sato ............................ 360/75 |
| 4,609,947 A | 9/1986 | Yamagiwa et al. .......... 358/310 |
| 4,614,991 A | 9/1986 | Murakami ................... 360/137 |
| 4,620,245 A | 10/1986 | Shimizu ....................... 360/85 |
| 4,628,372 A | 12/1986 | Morisawa .................... 360/40 |
| 4,628,383 A | 12/1986 | Miyamoto ................. 360/96.5 |
| 4,636,873 A | 1/1987 | Eguchi .......................... 360/8 |
| 4,637,023 A | 1/1987 | Lounsbury et al. ........... 371/38 |
| 4,641,210 A | 2/1987 | Ohyama .................... 360/96.5 |
| 4,642,714 A | 2/1987 | Miyamoto ................. 360/96.5 |
| 4,644,414 A | 2/1987 | Yamada et al. ............. 360/10.2 |
| 4,651,239 A | 3/1987 | Omori et al. .................. 360/77 |
| 4,654,731 A | 3/1987 | Froschl et al. ............. 360/96.5 |
| 4,663,673 A | 5/1987 | Doutsubo ................... 360/9.1 |
| 4,665,447 A | 5/1987 | Odaka .......................... 360/77 |
| 4,677,504 A | 6/1987 | Yamazaki et al. ............. 360/77 |
| 4,680,654 A | 7/1987 | Shibuya ..................... 360/96.5 |
| 4,682,247 A | 7/1987 | Doutsbo .................... 360/10.2 |
| 4,688,109 A | 8/1987 | Sangu ....................... 360/10.2 |
| 4,703,373 A | 10/1987 | Oosaka ......................... 360/97 |
| 4,714,971 A | 12/1987 | Sigiki et al. ................... 360/77 |
| 4,717,974 A | 1/1988 | Baumeister ................... 360/64 |
| 4,731,678 A | 3/1988 | Takeuchi ...................... 360/40 |
| 4,737,865 A | 4/1988 | Murakami et al. ......... 360/14.1 |
| 4,739,420 A | 4/1988 | Odaka et al. .................. 360/77 |
| 4,757,911 A | 7/1988 | Nakano et al. ................ 360/64 |
| 4,758,904 A | 7/1988 | Takashashi et al. ........ 360/19.1 |
| 4,760,474 A | 7/1988 | Takimoto ..................... 360/64 |
| 4,769,811 A | 9/1988 | Eckberg, Jr. et al. ......... 370/60 |
| 4,774,605 A | 9/1988 | Kato .......................... 360/72.2 |
| 4,786,011 A | 11/1988 | Furwara et al. ............. 242/195 |
| 4,796,115 A | 1/1989 | Ohshima et al. .............. 360/85 |
| 4,799,221 A | 1/1989 | Fukami et al. ................ 371/38 |
| 4,802,172 A | 1/1989 | Fukami et al. ................ 371/38 |
| 4,812,924 A | 3/1989 | Fukami et al. ................ 360/32 |
| 4,821,129 A | 4/1989 | Culp .......................... 360/74.4 |
| 4,835,628 A | 5/1989 | Hinz et al. .................... 360/48 |
| 4,843,495 A | 6/1989 | Georgis et al. .......... 360/77.15 |
| 4,845,577 A | 7/1989 | Georgis et al. ............. 360/72.2 |
| 4,897,739 A | 1/1990 | Hasegawa et al. .......... 360/37.1 |
| 4,910,736 A | 3/1990 | Tanaka et al. ............. 371/37.7 |
| 4,918,546 A | 4/1990 | Saito ....................... 360/77.13 |
| 4,930,027 A | 5/1990 | Steele et al. ................... 360/70 |
| 4,933,784 A | 6/1990 | Oldershaw et al. ...... 360/77.16 |
| 4,935,824 A | 6/1990 | Nakano et al. ................ 360/48 |
| 4,935,827 A | 6/1990 | Oldershaw et al. ....... 360/77.16 |
| 4,970,612 A | 11/1990 | Renders et al. ................ 360/95 |
| 4,977,469 A | 12/1990 | Yokozawa ............... 360/77.01 |
| 4,984,104 A | 1/1991 | Takahashi et al. ........ 360/77.14 |
| 5,003,411 A | 3/1991 | Nagahara et al. .......... 360/72.2 |
| 5,034,833 A | 7/1991 | Marlowe .................... 360/96.5 |
| 5,050,018 A | 9/1991 | Georgis et al. .......... 360/77.16 |
| 5,068,757 A | 11/1991 | Hughes et al. ............ 360/77.13 |
| 5,103,355 A | 4/1992 | Steele ...................... 360/77.13 |
| 5,115,500 A | 5/1992 | Larsen ....................... 395/425 |
| 5,142,422 A | 8/1992 | Zook et al. .................... 360/54 |
| 5,191,491 A | 3/1993 | Zweighaft ................ 360/77.13 |
| 5,249,212 A | 9/1993 | Covey et al. ............... 371/37.1 |
| 5,251,077 A | 10/1993 | Saitoh ........................... 360/54 |
| 5,262,905 A | 11/1993 | Takagi et al. ................. 360/53 |
| 5,327,305 A | 7/1994 | Thomas ..................... 360/74.5 |
| 5,349,481 A | 9/1994 | Kauffman et al. ......... 360/74.4 |
| 5,414,570 A | 5/1995 | Fry et al. ....................... 360/48 |
| 5,488,702 A | * 1/1996 | Byers et al. ................. 395/186 |
| 5,535,068 A | 7/1996 | Hughes .................... 360/73.04 |
| 5,602,694 A | 2/1997 | Miles et al. ................... 360/84 |
| 5,633,764 A | 5/1997 | Ohta ............................... 360/7 |
| 5,696,775 A | * 12/1997 | Nemazie et al. ............ 371/51.1 |
| 5,765,200 A | * 6/1998 | McIlvain ..................... 711/170 |
| 5,781,688 A | 7/1998 | Seong .......................... 386/79 |
| 5,828,513 A | * 10/1998 | Greenberg ............... 360/77.08 |
| 5,872,997 A | 2/1999 | Golson ........................ 395/872 |
| 5,953,177 A | 9/1999 | Hughes ...................... 360/74.1 |
| 6,124,993 A | * 9/2000 | Hallamasek .................. 360/48 |

* cited by examiner

METHOD AND APPARATUS FOR LOGICALLY REJECTING PREVIOUSLY RECORDED TRACK RESIDUE FROM MAGNETIC MEDIA

RELATED PATENTS

The present invention is related to co-pending U.S. patent application entitled "Method And System For Monitoring And Adjusting Tape Position Using Control Data Packets", invented by McAuliffe et al., and having a Ser. No. of 09/193,030, filed concurrently herewith on Nov. 16, 1998, and co-pending U.S. patent application entitled "A Method Of Reacquiring Clock Synchronization On A Non-Tracking Helical Scan Tape Device", invented by Blatchley et al., and having a Ser. No. of 09/192,808, filed concurrently herewith on Nov. 16, 1998, and co-pending U.S. patent application entitled "Rogue Packet Detection And Correction Method For Data Storage Device", invented by McAuliffe et al., and having a Ser. No. of 09/192,808, filed concurrently herewith on Nov. 16, 1998, and co-pending U.S. patent application entitled "Variable Speed Recording Method and Apparatus for a Magnetic Tape Drive", invented by Beavers et al., and having a Ser. No. of 09/176,179, filed on Oct. 20, 1998, and co-pending U.S. patent application entitled "Overscan Helical Scan Head for Non-Tracking Tap Subsystems Reading at up to 1x Speed and Method for Simulation of Same", invented by Blatchley et al., and having a Ser. No. of 09/176,013, filed on Oct. 20, 1998, and co-pending U.S. patent application entitled "Fine Granularity Rewrite Method and Apparatus for Data Storage Device", invented by Zaczek, and having a Ser. No. of 09/176,015, filed on Oct. 20, 1998, and co-pending U.S. patent application entitled "Multi-level Error Detection and Correction Technique for Data Storage Recording Device", invented by McAuliffe et al., and having a Ser. No. of 09/176,014, filed on Oct. 20, 1998, all of which are commonly owned and all of which are hereby incorporated by reference.

FIELD OF THE INVENTION

The present invention pertains generally to data recording and recovery methods, and more particularly to a method for logically rejecting previously recorded track residue from magnetic media.

BACKGROUND OF THE INVENTION

Tape storage technology is routinely used for routine system back up and long-term data archiving. In the ongoing goal to minimize the cost-to-capacity ratio while still maintaining data integrity, ways are always looked at to reduce drive costs. One way to reduce drive costs is to reduce the costs of the components of the recording device. For example, in the tape drive industry, many tape drive architectures employ an erase head for erasing a magnetic tape before recording data to it. In prior art architectures, this is necessary because portions of tracks written onto the tape that are not precisely overwritten may be unintentionally detected by the read head during a later read session. These previously written portions of tracks, herein termed "residue", are problematic because although they are not intended to be read, they are still detected by the read logic.

Accordingly, a need exists for a method for logically rejecting previously recorded track residue during a read session to prevent data that is not intended to be read from being included in the recovered data sent to the host system.

U.S. Pat. No. 4,910,736 to Tonaka et al. describes the addition of an identification (ID) code and an error check code to each block of the data that makes up a track. The ID code is used to indicate that the block of data belongs to a particular recording session. The error check code is used for error checking of the block of data. In the absence of an error, the original ID code is reconstructed and compared to a reference ID code obtained from a reference ID code setting circuit. If the reconstructed ID code does not match the reference ID code, the block of data is logically rejected as not intended to be read. This approach for logically rejecting residue data reconstructs the original ID code for each block of data recovered from the medium. In addition, a separate reference ID code setting circuit is employed to obtain the reference ID code.

In the interest of reducing the amount of time it takes to determine whether a given block of data belongs to the same recording session as identified by the reference ID code, it would be desirable to have a method for logically rejecting recovered data without having to reconstruct the original ID code for every block of data. In addition, it would be desirable to reduce the amount of hardware, and thus the amount of valuable chip space required to implement the method.

SUMMARY OF THE INVENTION

The present invention is a novel method for logically rejecting previously recorded track residue from magnetic media by encoding an identical recording session ID code into the track packet error correction code of every track packet recorded during a single write session. Error correction is performed on the first few track packets to acquire a reference session ID. The reference session ID is used to preload the ECC syndrome and CRC generators prior to processing each recovered packet to determine whether the recovered packet is valid for the current session. Those packets that are recovered but which have a session ID that does not match the acquired session ID are inherently rejected as unintended to be read because the ECC syndromes and CRC generators will indicate an error. As a result, there is no need to actually reconstruct the packet's original session ID. Accordingly, the invention provides an efficient way of determining whether a recovered track packet was recorded during the recording session identified by the acquired session ID.

In accordance with the invention, a session ID unique to a given recording session is generated at the beginning of the recording session and encoded into an error correction code redundancy field of a track packet. When the track packet is written to tape, the session ID itself is not actually sent to the tape, thereby reducing the amount of overhead data required for each track and increasing the actual data-capacity-to-overhead ratio of the media. During a data recovery session, the session ID encoded in the ECC redundancy field of the track packet is acquired by assuming that the entire contents of the first few track packets are good and performing packet error correction on a number of packets to reconstruct the current session ID. If several consecutively reconstructed session IDs match, the session ID is considered acquired. Once the session ID is acquired, it is preloaded into the CRC/ECC error detection and correction hardware prior to processing each subsequent recovered track packet. Only recovered track packets that are encoded with the acquired session ID are considered good and therefore allowed to be sent to the data buffer; packets that are encoded with a different session ID other than the acquired session ID are rejected by the CRC/ECC error detection and correction hardware.

Accordingly, the technique of the invention eliminates the need for a costly erase head yet requires no additional track packet overhead to be recorded onto the magnetic media. In addition, track packet rejection is more efficient since once the reference session ID is acquired, the original session ID need not be reconstructed for every recovered track packet. Finally, the same error correction hardware used to correct packet errors is used to acquire the session ID, thereby eliminating the requirement for separate hardware to do each function.

BRIEF DESCRIPTION OF THE DRAWING

The invention will be better understood from a reading of the following detailed description taken in conjunction with the drawing in which like reference designators are used to designate like elements, and in which.

DETAILED DESCRIPTION

A method and apparatus for logically rejecting previously recorded track residue during a read session of data recorded over the previously recorded tracks is described in detail hereinafter.

In the recording of data onto a magnetic medium that contains previously recorded tracks, previously recorded track residue can result unless the portion of the media on which the new data is recorded is erased. Previously recorded track residue can result for a number of reasons, including recording/recovery device or media interchange issues, track pitch discontinuity, variable speed recording capability, track curvature, or head clogs.

Figure 1A:
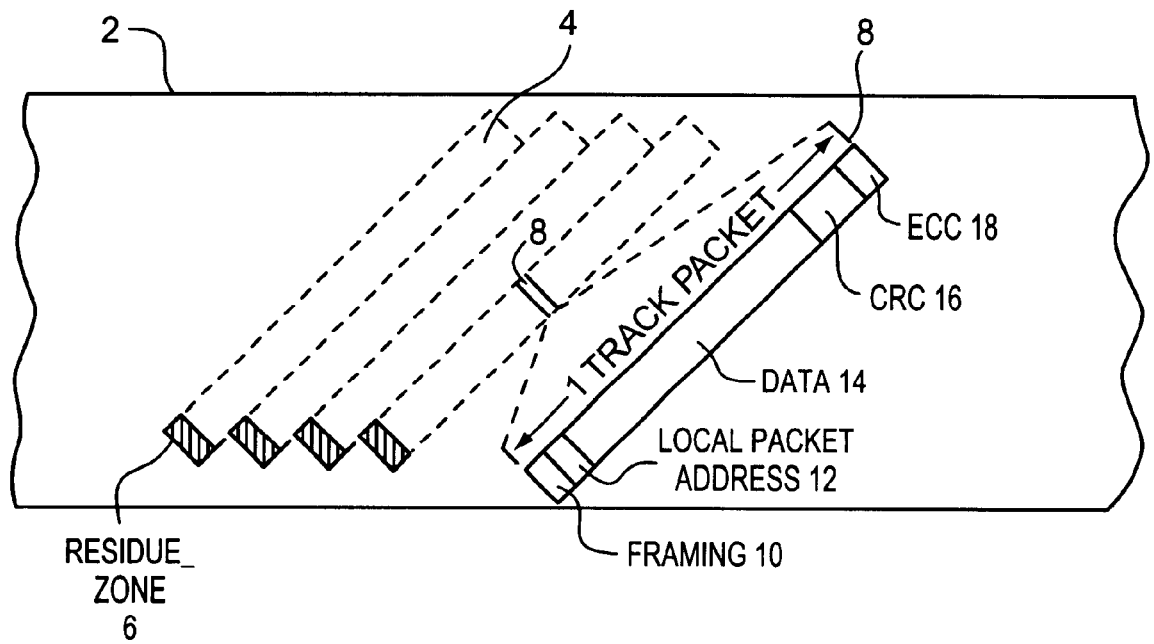
FIG. 1(a) is a side view of a portion of a magnetic tape illustrating a first track pattern that results in a previously recorded track residue zone.

FIG. 1(a) is a side view of a portion of a magnetic tape 2 illustrating previously recorded track residue zones 6 resulting from interchange between recording/recovery devices or media. More recently recorded tracks 4 overwrite most but not all of any previously recorded tracks. However, when magnetic media is recorded on one device and then re-recorded to on a different device, a slight difference in recording head alignment prevents the previously recorded tracks from being precisely overwritten and thus results in residue zones, for example those shown at 6 on magnetic tape 2.

Figure 1B:
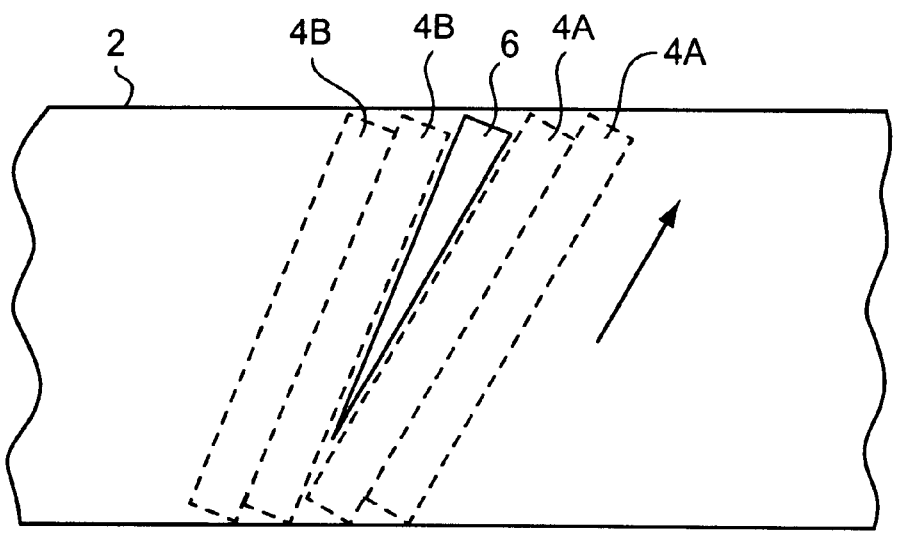
FIG. 1(b) is a side view of a portion of a magnetic tape illustrating a second track pattern that results in a previously recorded track residue zone.

FIG. 1(b) illustrates a second track pattern that results in a previously recorded track residue zone. In this embodiment, residue zone 6 results from variable recording speeds. In drives that support variable speed recording, a speed change results in an angular gap between tracks 4a recorded at one speed and tracks 4b recorded at another speed. When a recording speed change occurs over a portion of previously recorded media, previously recorded track residue zones 6 result in the angular gap between tracks 4a and 4b.

Referring back to FIG. 1(a), data is formatted into track packets 8 before being recorded to the magnetic media 2. Multiple track packets 8 exist on each track 4. Each track packet 8 includes framing information 10 used by the read logic of the recording/recovery device for detecting the leading edge of a packet 8, a local packet address field 12 used by the read logic in constructing the global address of the data, a data field 14 for storing user data if the track packet is a data field, a CRC field 16 used by the read logic to detect an error in data field 14, and an error correction code ECC field 18 used in conjunction with the CRC field 16 to detect and correct errors across packet 8. As described hereinafter, the session ID is encoded in the CRC field 16 and ECC field 18 and may be recovered via error correction techniques. However, the session ID itself is not separately stored in the packet on the media.

Figure 2A:
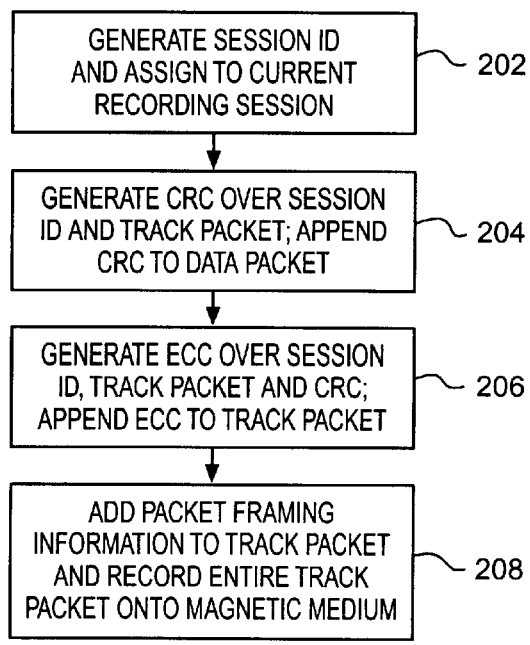
FIG. 2(a) is a flowchart illustrating a method in accordance with the invention for generating and encoding a session ID in a track packet.
Figure 2B:
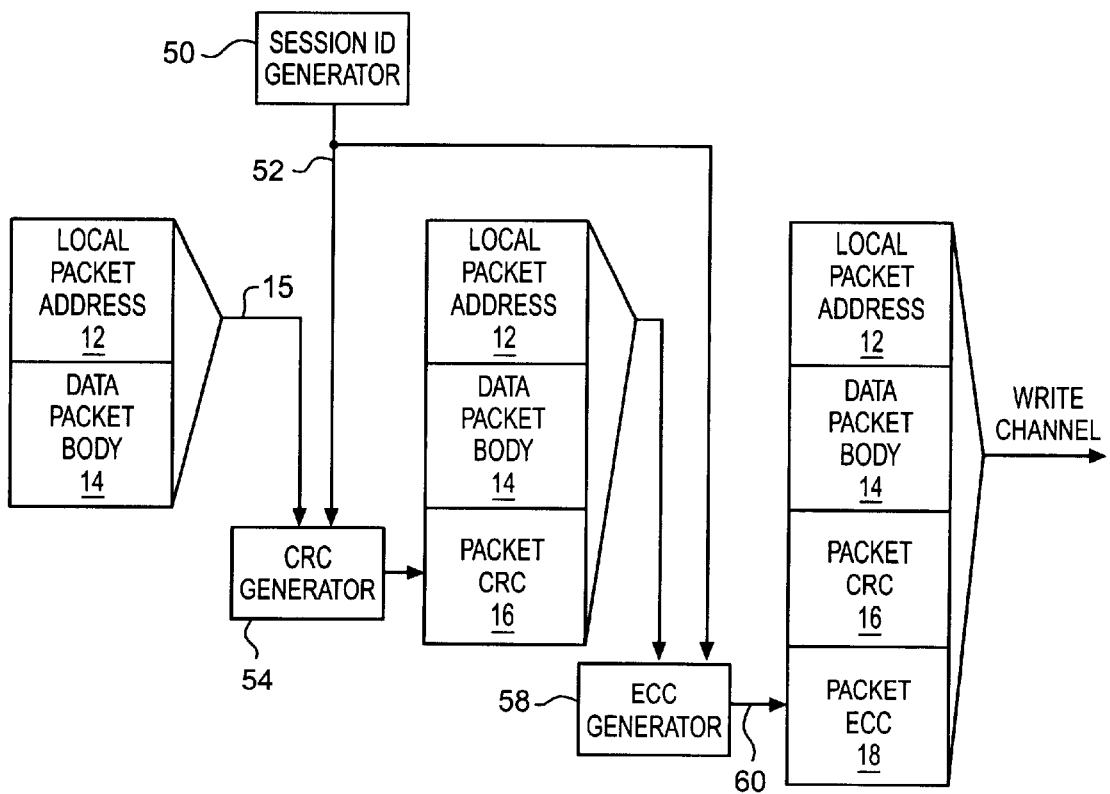
FIG. 2(b) is a diagram illustrating the construction of a track packet in accordance with the method of FIG. 2(a)

FIG. 2(a) is a flowchart illustrating a method in accordance with the invention for generating and encoding a session ID in a track packet 8. FIG. 2(b) is a diagram illustrating the construction of a track packet 8 in accordance with the method of FIG. 2(a). At the beginning of a recording session, a session ID 52 is generated by a session ID generator 50 and assigned to the current recording session in step 202. The tape drive firmware keeps track of the last session ID used as part of its logical formatting on tape and always assigns the next one in sequence when a new write session begins. This is accomplished by storing system data containing the last used session ID in the end-of-data (EOD) area and/or the system partition area on the tape that contains system data used by the drive. Thus, when data is appended to previously recorded data during a new recording session, the tape drive firmware extracts the last used session ID from the system data contained in the EOD area, and increments it by one to generate the current session ID. The session ID remains constant during the entirety of the recording session.

During a recording session, user data is partitioned into data packets 15, which include data field 14 and local packet address field 12. Data packets are formatted into track packets 8 before being recorded to a magnetic media. In step 204, a CRC generator 54 generates a CRC 56 across the assigned session ID 52 and the data packet 15. The CRC 56 is appended as CRC field 16 to the data packet 15. In step 206, an ECC generator 58 generates an error correction code (ECC) 60 over the assigned session ID 52, local packet address field 12, data field 14, and CRC field. The ECC 58 is appended as ECC field 18 to track packet 8. Framing information 10 is added ahead of track packet 8, which is then modulated and sent to the write channel of the recording device to be recorded onto the magnetic media in step 208.

Figure 3A:
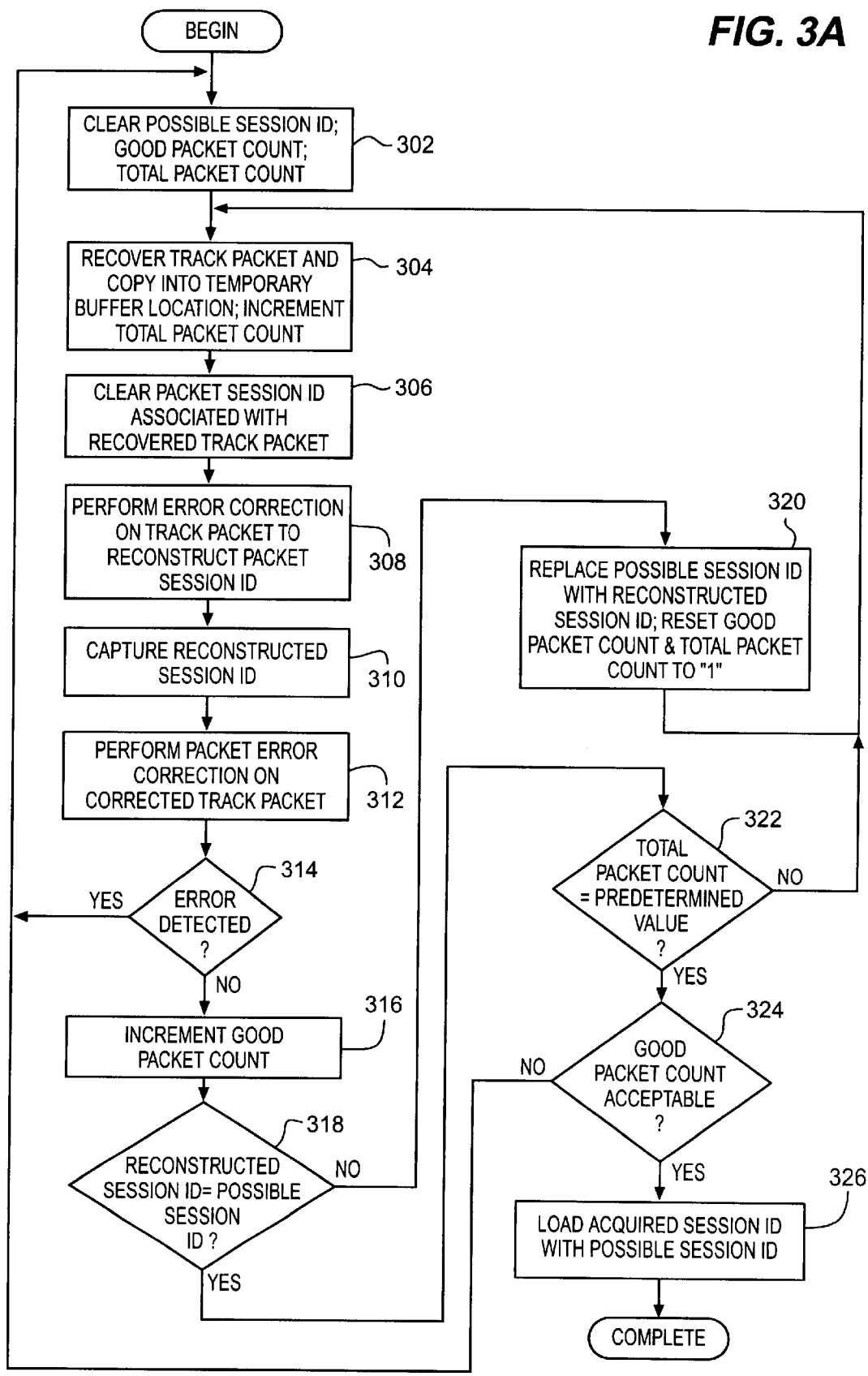
FIG. 3(a) is a flowchart illustrating one embodiment of a method in accordance with the invention for acquiring the current session ID at the start of a data recovery session when the tape drive is in a normal read mode.
Figure 3B:
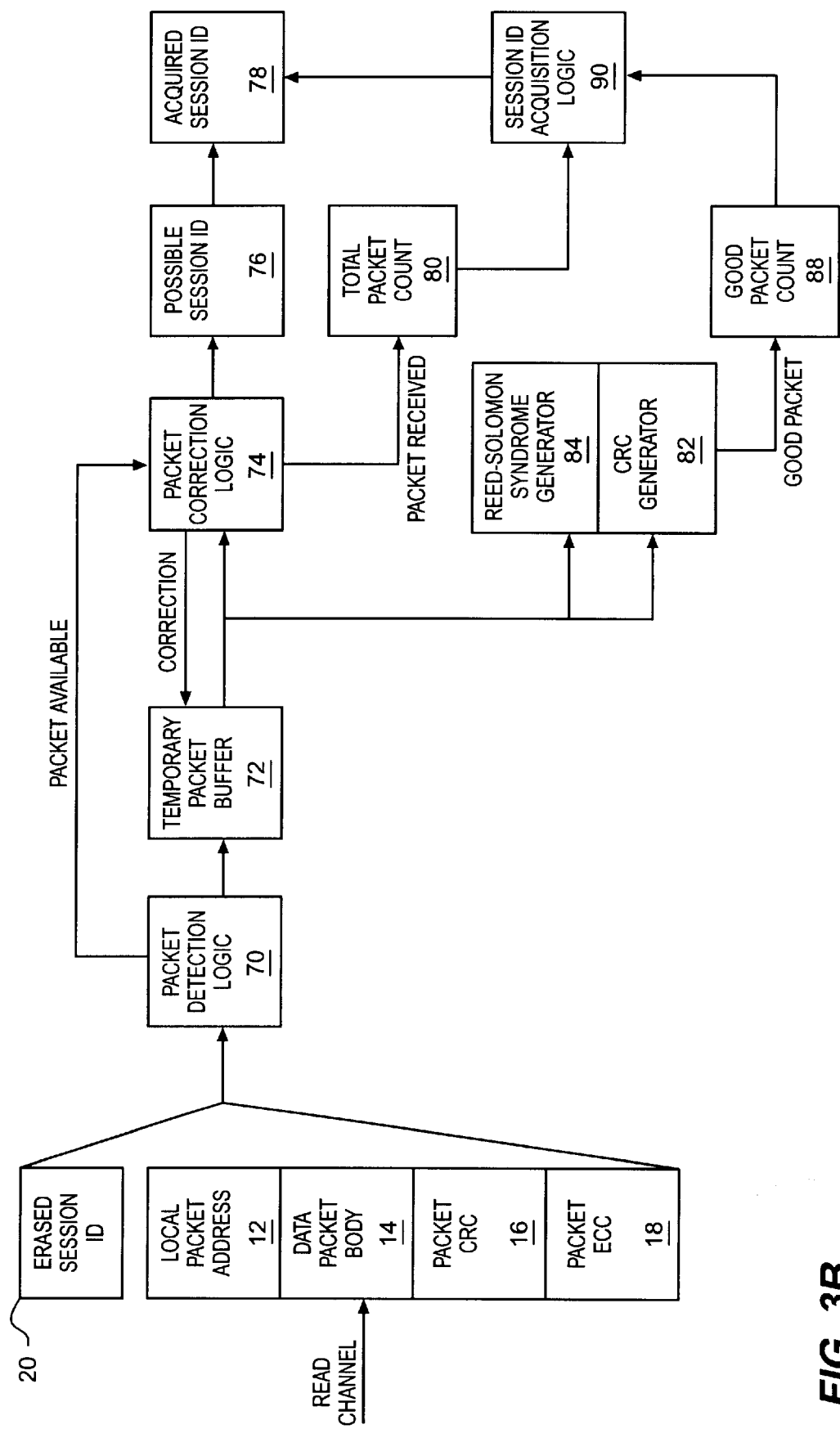
FIG. 3(b) is a diagram illustrating the construction of a track packet in accordance with the method of FIG. 3(a)

FIG. 3(a) is a flowchart illustrating one embodiment of a method in accordance with the invention for acquiring the current session ID at the start of a data recovery session when the tape drive is in a normal read mode (i.e., when the tape is moving at normal read speed). FIG. 3(b) is a diagram illustrating the construction of a track packet in accordance with the method of FIG. 3(a).

During the acquisiton of a session ID, all data packets recovered are assumed to contain no errors. The method 300 begins with a step 302 in which a possible session ID 76, a total packet count 80, and a good packet count 88 are each cleared. In a step 304, a track packet 8 is recovered from tape and copied (minus the framing information 10) into a temporary buffer location 72, and the total packet count is incremented. In a step 306, a packet session ID 20 associated with the track packet 8 is cleared (i.e., reset to all zeros) in preparation for error correction by packet error correction logic 74. In step 308, error correction is performed on track packet 8 by error correction logic 74. This step corrects the erased packet session ID 20 using the contents of the track packet 8 located in temporary buffer location 72, which are assumed to be correct, to reconstruct the original packet session ID of recovered track packet 8. The reconstructed packet session ID is captured as a possible session ID in step 310. CRC and ECC generators 82 and 84 perform error detection on the corrected track packet 8 in step 312. If an error is detected, as determined in step 314, the possible session ID and track packet are rejected, and the process repeats beginning at step 302. If no errors are detected in the track packet 8, the good packet count is incremented in step 316. The reconstructed packet session ID is then compared against the possible session ID 76 in step 318. After the first pass, a mismatch will occur since the possible session ID 76 is cleared at the beginning of the acquisition process. Accordingly, the reconstructed packet session ID is captured as the possible session ID 76 in step 320. At the point in the method reach in step 320, a single good possible session ID has been detected. In accordance with the illustrative embodiment, the method is always looking for two identical session IDs in a row as a criteria for considering a reconstructed session ID as a real possible session ID. Accordingly, in step 320 the good packet count and total packet count are set to a count value of one if they are not already set to one. Steps 304 through 318 are repeated to attempt to capture two identical reconstructed packet session IDs for two contiguous track packets 8.

Once two contiguous track packets 8 are detected to have been recorded during the same recording session (by having identical packet session ID's), subsequent recovered track packets 8 are monitored for a predetermined number of total packets to determine the ratio of good packets to rejected packets. This stage of the acquisition process begins in step 318 if the reconstructed session ID matches the possible session ID for a second or greater consecutive good track packet with an identical reconstructed session ID. For every subsequent error-free track packet with an identical reconstructed packet ID up to a predetermined number of total subsequent tracks, steps 304 through 316 are repeated. Then in step 322, a determination is made as to whether the predetermined total number of consecutive packets have been processed. If not, steps 304 through 322 are repeated. Once the predetermined total number of consecutive packets have been processed, the ratio of good packets to total processed packets, based on the value of the good packet count 88, is determined in step 324. If the value of good packet count 88 is not acceptable, for example by comparing it to a minimum threshold level, the possible session ID is discarded and the entire acquisition process beginning with step 302 is repeated. If, however, the value of good packet count 88 is acceptable, the session ID is considered acquired, and the possible session ID 76 is adopted as the acquired session ID 78 in step 326.

In the illustrative embodiment, the session ID acquisition logic 90 waits to process two identical session ID 76 values in a row during a reconstruction portion of the acquisition process, determines whether an acceptable number of good packets are detected during a predetermined number of total subsequent recovered track packets during a verification portion of the acquisition process, and adopts the session ID 76 as the acquired session ID 78 if an acceptable number of good packets are detected during this period. It will be appreciated by those skilled in the art that the number of required identical reconstructed packet session ID's detected during the reconstruction portion of the acquisition process, and the number of required good packets recovered during the verification portion of the acquisition process, are adjustable.

Figure 4A:
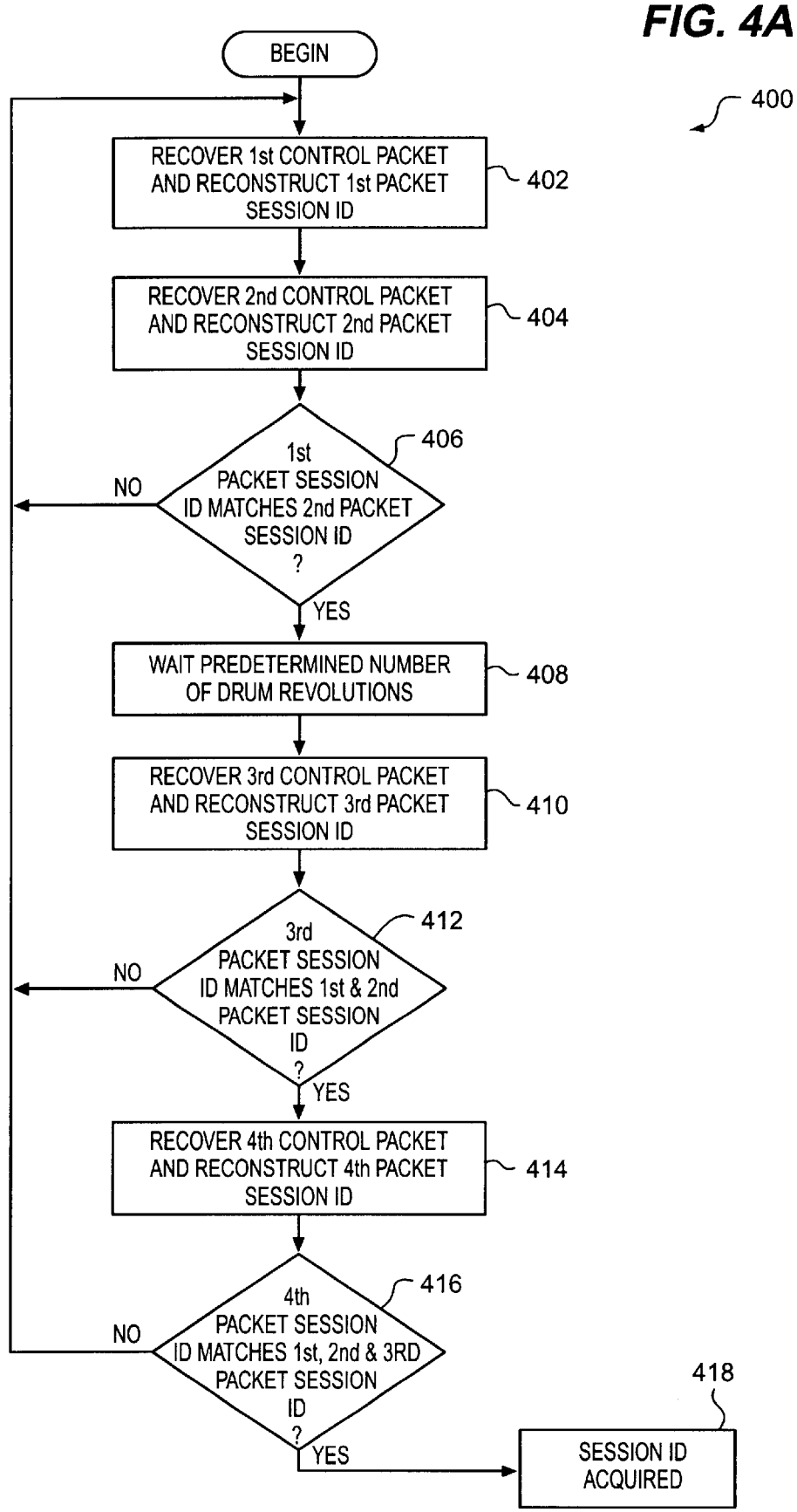
FIG. 4(a) is a flowchart of one embodiment of a high-speed search session ID acquisition method.
Figure 4B:
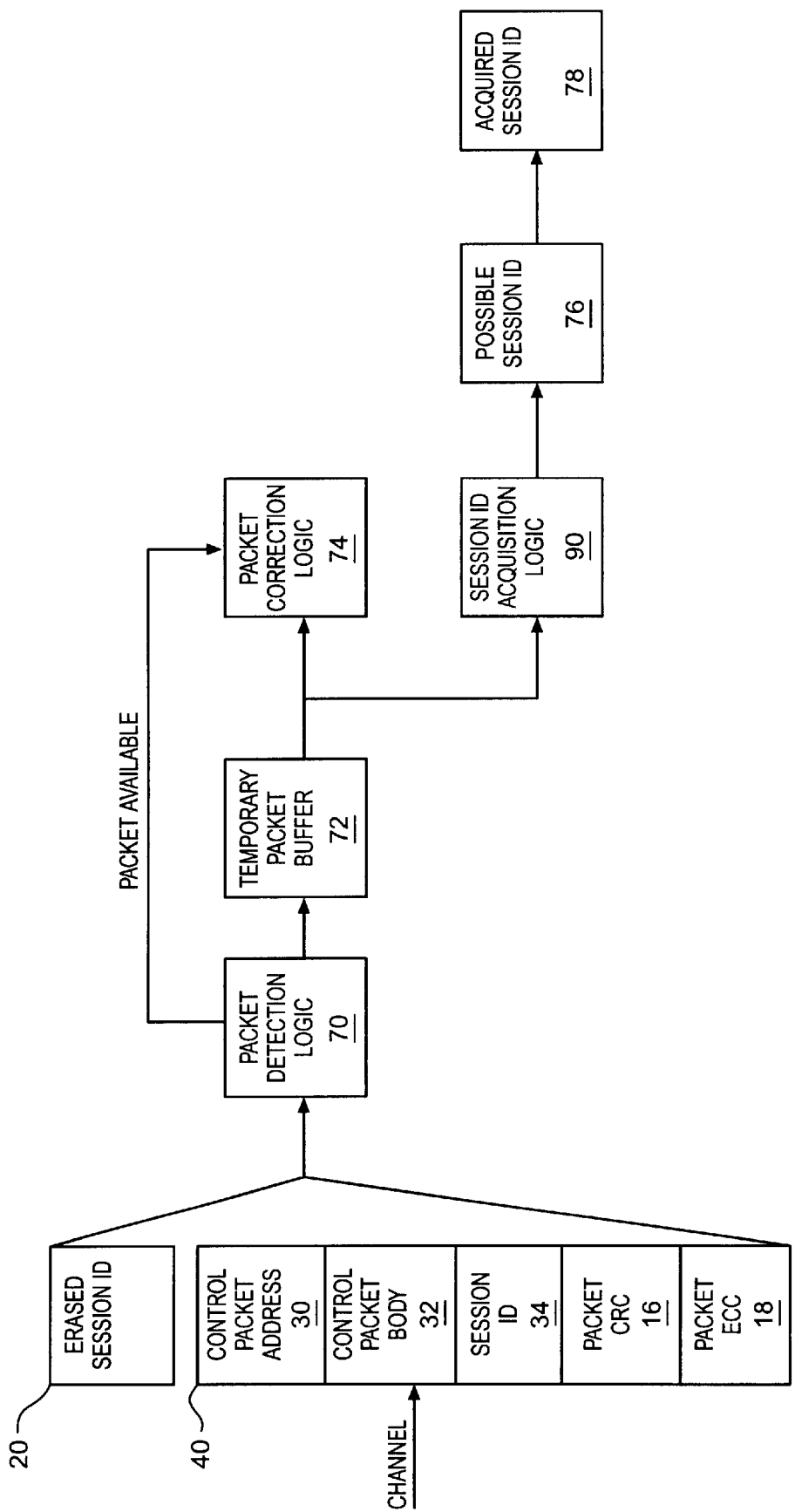
FIG. 4(b) is a diagram illustrating the high-speed search session ID acquisition process.

In a preferred embodiment, the session ID may also be acquired when the drive is operating in a high-speed search mode—that is, the tape is being transported at greater than normal read speed and data is not actually being read from the tape. FIG. 4(a) is a flowchart of one embodiment of a high-speed search session ID acquisition method 400. FIG. 4(b) is a diagram illustrating the high-speed search session ID acquisition process. According to the preferred embodiment for high-speed search mode session ID acquisition, session ID acquisition logic 90 monitors only control packets recovered from tape at high speed. Each control packet 40 includes a control packet address 30, a control packet body 32 that contains control information including the session ID 34 that matches that of the recording session when the control packet was recorded, a packet CRC field 16 and a packet ECC field 18. Packet detection logic 70 detects control packets 40 and places them into a temporary packet buffer location 72. Packet correction logic 74 reconstructs the packet session ID 34 for each recovered control packet 40. Session ID acquisition logic 90 processes the recovered control packets 40 and associated reconstructed packet session ID's 32 to acquire the original session ID 78 of a particular portion of tape.

In the preferred embodiment, a first control packet is recovered and its associated packet session ID is reconstructed in a step 402. The reconstructed packet session ID is maintained as a possible session ID 76. In a step 404, a second control packet is recovered and its associated packet session ID is reconstructed. The second reconstructed packet session ID is compared to the possible session ID 76 in a step 406. If the two session ID's do not match, the process starts over again with step 402. If the two session ID's do match, however, the session ID acquisition logic 90 waits a predetermined (preferably programmable) number of drum revolutions in step 408. A third control packet 40 is recovered in step 410 and its associated packet session ID is reconstructed. The third packet session ID is compared to the possible session ID in step 412. If the third packet session ID does not match the possible session ID, the process starts over again with step 402. If the third session ID does match the possible session ID, a fourth control packet 40 is recovered in step 414 and its associated packet session ID is reconstructed. The fourth packet session ID is compared to the possible session ID in step 416. If the third packet session ID does not match the possible session ID, the process starts over again with step 402. If the fourth session ID does match the possible session ID, the possible session ID is adopted as the acquired session ID in step 418 and the method 400 is complete. Once a session ID is acquired, it is used until a programmable number of control packets have failed to be read. When this condition occurs, the logic repeats the session ID acquisition.

In the preferred embodiment, the tape drive has the capability for allowing a user to set the session ID, thereby overriding an automatically acquired session ID.

Figure 5A:
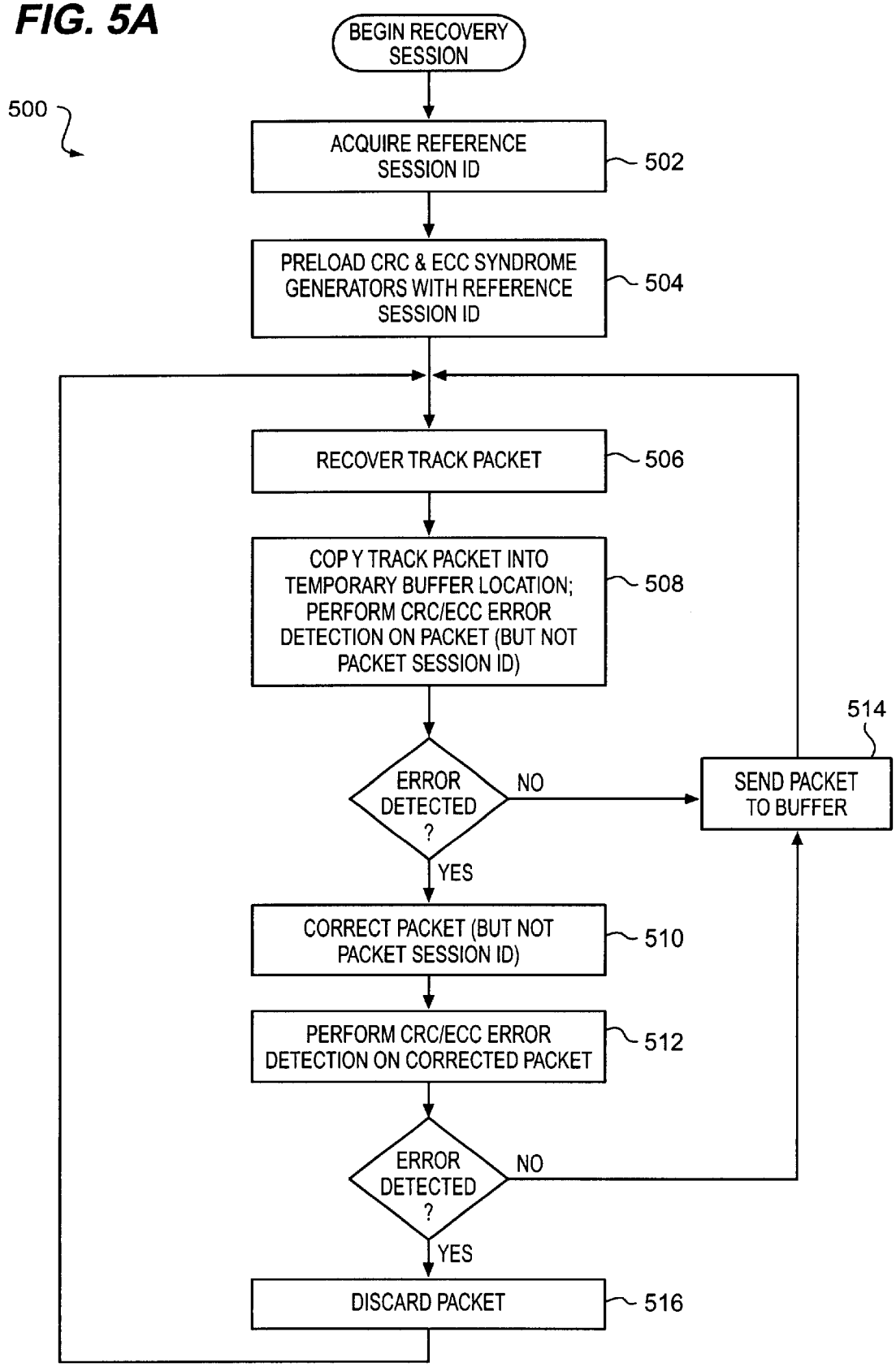
FIG. 5(a) is a flowchart of one embodiment of a method in accordance with the invention for logically rejecting residue data during a data recovery session.

FIG. 5(a) is a flowchart of one embodiment 500 of a method in accordance with the invention for logically rejecting residue data during a data recovery session. The method 500 begins by first acquiring a reference session ID in step 502. The reference session ID is acquired, for example, using the method of FIG. 3(a) or 4(a). In a step 504, the reference session ID is preloaded into the CRC and ECC syndrome generators 82 and 84. A track packet 8 is recovered from tape during a step 506. In step 508, the track packet 8 is simultaneously copied into a temporary packet buffer location 72 and sent to the CRC and ECC syndrome generators 82 and 84 to detect any errors in the local packet address field 12 or data field 14 of the packet. If an error is detected in the address or data field of the packet, it is corrected by packet correction logic 74 in step 510. Error correction is performed on the corrected packet in step 512 in case the packet was miscorrected due to being encoded with a residue session ID. If an error is detected, the packet is discarded in step 516 and not sent to the data buffer because it would have been corrected correctly by the packet correction logic 74 if its original packet session ID as encoded in the packet CRC field 16 and packet ECC field 18 matched that of the reference session ID. Accordingly, the packet is inherently rejected as unintended to be read and is not copied from the temporary packet buffer location 72 for further processing. However, if the CRC and ECC syndrome generators 82 and 84 do not initially detect any errors in step 508, or after the packet has been corrected in step 512, the packet is considered good and sent to the data buffer in step 514. Steps 506 through 516 are repeated for each subsequent recovered track packet 8 of the current data recovery session.

Figure 5B:
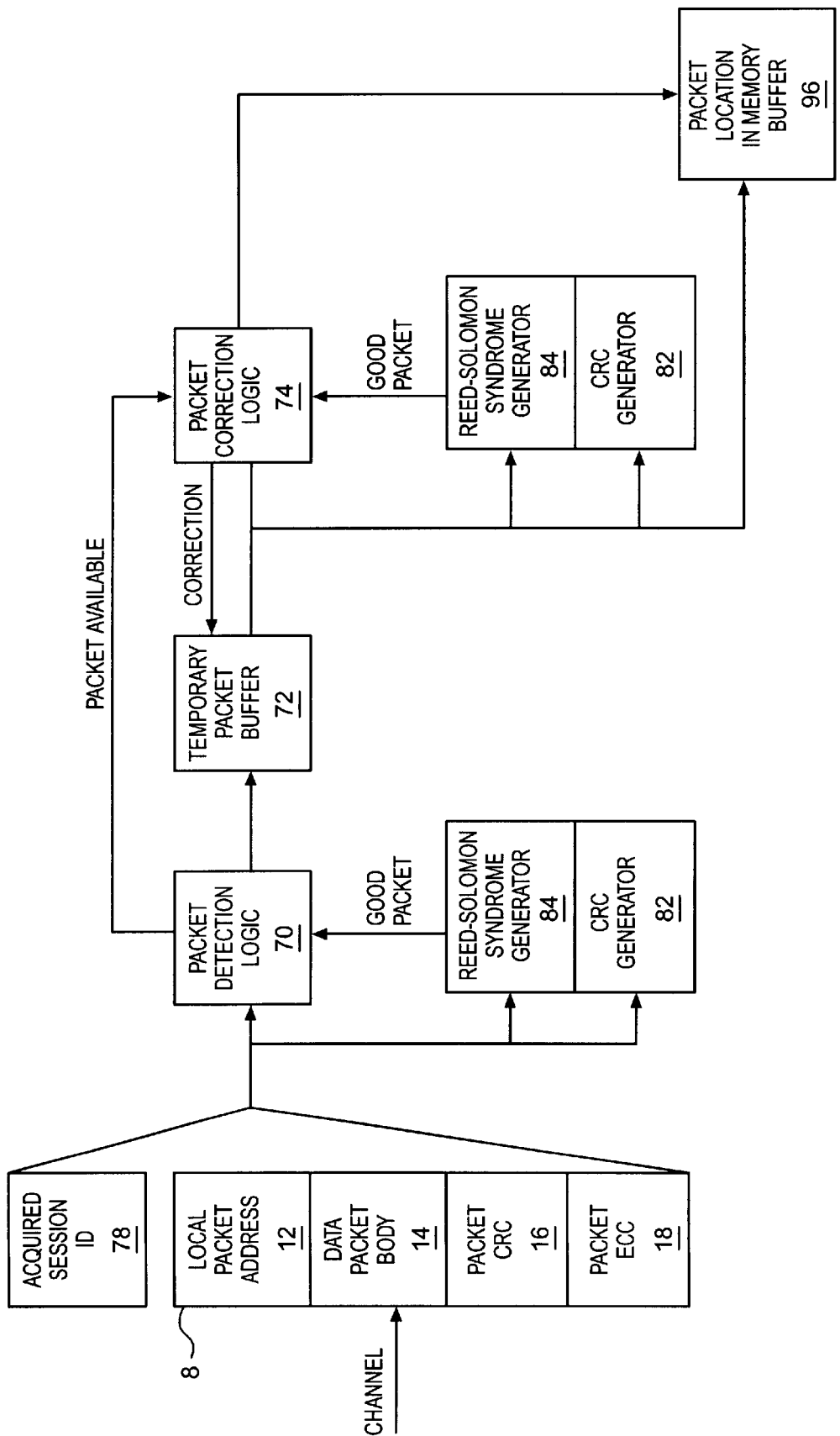
FIG. 5(b) is a diagram illustrating the process of FIG. 5(a).

FIG. 5(b) is a diagram illustrating the process of FIG. 5(a). During a data recovery session, once the session ID for the current session is acquired, data packets 8 and control packets 40 are checked by packet detection logic 70 while they are written into temporary packet buffer location 72. Packet detection logic 70 notifies the packet correction logic 74 when a packet 8 is available in the temporary buffer location 72. Packet correction logic 74 corrects any error in the address field 12 or data field 14 of packets 8 that fail checks by the CRC generator 82 and Reed-Solomon ECC generator 84 that were performed by the packet detection logic 70. If error correction was performed on a packet 8, CRC and ECC error detection is performed on the corrected packet by CRC generator 82 and ECC generator 84 as it is being sent to its location in the data buffer 96 in case the packet was miscorrected due to being encoded with a residue session ID. If the packet 8 was miscorrected, the error detection circuitry 82 and 84 will detect this condition and the miscorrected packet 8 is discarded.

It will be appreciated by those skilled in the art that the present invention provides several advantages over the prior art. First, the need for a costly erase head and associated control hardware is eliminated. Secondly, track packet rejection is more efficient since, once the reference session ID is acquired at the start of a data recovery session, the packet session ID need not be reconstructed for every subsequent recovered track packet. Finally, the same error detection hardware used to detect packet errors and same error correction hardware used to correct packet errors is used to acquire the session ID, thereby eliminating the requirement for separate session ID acquisition hardware.

Although the invention has been described in terms of the illustrative embodiments, it will be appreciated by those skilled in the art that various changes and modifications may be made to the illustrative embodiments without departing from the spirit or scope of the invention. It is intended that the scope of the invention not be limited in any way to the illustrative embodiment shown and described but that the invention be limited only by the claims appended hereto.

What is claimed is:

1. A method for logically rejecting previously recorded recovered track packets from a magnetic media, comprising:
   acquiring a reference session identifier (ID);
   recovering a track packet from said magnetic media, said track packet comprising a data field, an error detection and or correction (detection/correction) field, and a packet session identifier (ID) encoded in said error detection/correction field;
   generating an error code over said data field using said error detection/correction field and said acquired reference session ID without reconstructing said packet session ID encoded in said error detection/correction field, said error code indicative of the presence or absence of an error in said data packet; and
   if said error code indicates no error in said track packet, considering said data packet as belonging to a session identified by said reference session identifier.

2. A method in accordance with claim 1, comprising:
   repeating said recovering step through said considering step without reacquiring said reference session ID.

3. A method in accordance with claim 1, wherein:
   said error detection/correcbon field comprises a cyclical redundancy code (CRC) with said packet session ID encoded in said CRC.

4. A method in accordance with claim 1, wherein:
   said error detection/correction field comprises:
   a cyclical redundancy code (CRC) with said packet session ID encoded in said CRC; and
   an error correction code (ECC) with said packet session ID encoded in said ECC.

5. A method in accordance with claim 1, wherein:
   said error detection/correction field comprises an error correction code (ECC) with said packet session ID encoded in said ECC.

6. A method in accordance with claim 1, wherein:
   said error detection/correction field comprises a cyclical redundancy code (CRC) with said packet session ID encoded in said CRC; and
   said error code generator comprises a cyclical redundancy code (CRC) generator which receives said reference session ID and said encoded CRC code.

7. A method in accordance with claim 1, said acquiring step comprising:
   recovering a predetermined number of track packets that have identical packet session ID's; and
   adopting said identical packet session ID as said reference session ID.

8. A method in accordance with claim 7, comprising;
   recovering a first track packet;
   reconstructing said packet session ID of said first track packet;
   holding said reconstructed packet session ID of said first track packet as a possible session ID;
   recovering a next track packet;
   reconstructing said packet session ID of said next track packet;
   comparing said reconstructed packet session ID of said next track packet to said possible session ID;
   repeating said first track packet recovery step through said comparison step if said reconstructed packet session ID of said next track packet does not match said possible session ID;

determining whether a predetermined number of packets have been recovered since said first track packet was recovered;

repeating said next track packet recovering step through said determining step if said predetermined number of packets have not yet been recovered; and adopting said possible session ID as said acquired session ID if said predetermined number of packets have not yet been recovered.

9. A method for acquiring a session identifier from a magnetic media, said method comprising the steps of:

recovering a first track packet from said magnetic media, said first track packet comprising a first data field, a first error correction field, and a first packet session identifier (ID) encoded in said first error correction field;

performing error correction on said first track packet to reconstruct said first packet session ID encoded in said first error correction field;

recovering a subsequent track packet from said magnetic media, said subsequent track packet comprising a subsequent data field, a subsequent error correction field, and a subsequent packet session ID encoded in said subsequent error correction field;

performing error detection on said subsequent track packet using said reconstructed first packet session ID;

repeating said first recovering step through said second performing step if an error is detected in said subsequent track packet; and repeating said second recovering step through said second repeating step until a a predetermined number of subsequent recovered track packets are detected as error-free.

10. An apparatus for logically rejecting previously recorded recovered track packets from a magnetic media, comprising:

a packet detection circuit which detects a track packet from said magnetic media, said track packet comprising a data field, an error detection and or correction (detection/correction) field, and a packet session identifier (ID) encoded in said error detection/correction field;

an error code generator which receives a reference session identifier (ID) and said track packet detected by said packet detection circuit and generates an error code over said data field using said error detection/correction field and said acquired reference session ID without reconstructing said packet session ID encoded in said error detection correction field, said error code indicative of the presence or absence of an error in said data packet; and packet error detection circuitry that monitors said error code and passes said data field of said track packet to a data buffer if said error code indicates no error in said track packet.

11. A method in accordance with claim 10, wherein:

said error detection/correction field comprises an error correction code (ECC) with said packet session ID encoded in said ECC; and said error code generator comprises an error correction code (ECC) generator which receives said reference session ID and said encoded ECC code.

12. A method in accordance with claim 10, wherein:

said error detection correction field comprises a cyclical redundancy code (CRC) with said packet session ID encoded in said CRC and an error correction code (ECC) with said packet session ID encoded in said ECC; and said error code generator comprises a cyclical redundancy code (CRC) generator which receives said reference session ID and said encoded CRC code and an error correction code (ECC) generator which receives said reference session ID and said encoded ECC code.

* * * * *